US011951732B2

(12) United States Patent
Thebud et al.

(10) Patent No.: US 11,951,732 B2
(45) Date of Patent: Apr. 9, 2024

(54) ADHESIVE PRINTING FORM ATTACHMENT LAYER IN TUBE SHAPE, METHOD FOR ITS MANUFACTURE, AND METHOD OF PRINTING USING THE SAME

(71) Applicant: tesa SE, Norderstedt (DE)

(72) Inventors: Nils Thebud, Lüneburg (DE); Tanja Butteriss, Norderstedt (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 17/638,634

(22) PCT Filed: Aug. 19, 2020

(86) PCT No.: PCT/EP2020/073165
§ 371 (c)(1),
(2) Date: Feb. 25, 2022

(87) PCT Pub. No.: WO2021/037621
PCT Pub. Date: Mar. 4, 2021

(65) Prior Publication Data
US 2022/0297420 A1 Sep. 22, 2022

(30) Foreign Application Priority Data
Aug. 30, 2019 (EP) .................................... 19194643

(51) Int. Cl.
*B41F 27/12* (2006.01)
*B41N 6/02* (2006.01)

(52) U.S. Cl.
CPC ............ *B41F 27/1275* (2013.01); *B41N 6/02* (2013.01); *B41P 2200/12* (2013.01)

(58) Field of Classification Search
CPC ................................ B41F 27/125; B41N 6/02
See application file for complete search history.

(56) References Cited

U.S. PATENT DOCUMENTS 5,601,020 A * 2/1997 Dawley ................. B41F 27/105 101/217
5,983,799 A 11/1999 Lane, III et al.
(Continued)

FOREIGN PATENT DOCUMENTS

DE 60006285 T2 7/2004
EP 1240021 A1 9/2002
(Continued)

OTHER PUBLICATIONS

Polymount Twinlock Animation; VisualChefs; https://vimeo.com/141026668; accessed on May 9, 2023; published Oct. 1, 2015. (Year: 2015).*

(Continued)

*Primary Examiner* — Daniel J Colilla
(74) *Attorney, Agent, or Firm* — Price Heneveld LLP

(57) ABSTRACT

An Adhesive Printing Form Attachment Layer comprises a permanently sticky layer, characterized in that the Adhesive Printing Form Attachment Layer is in the shape of a tube, preferably a seamless tube, and the permanently sticky layer forms at least the outer surface of the tube. The Adhesive Printing Form Attachment Layer can be used to adhesively fix a printing plate, preferably a flexographic printing plate, to a printing cylinder during the printing operation. The Adhesive Printing Form Attachment layer provides for easy replacement and easy installation on a printing sleeve or printing cylinder. Also provided are an assembly, comprising an adhesive printing form attachment layer according to the invention mounted on a printing sleeve, and a method of operating a printing machine, the method comprising forming the assembly by pulling the adhesive printing form attachment layer over the printing sleeve.

20 Claims, 1 Drawing Sheet

(56) References Cited

U.S. PATENT DOCUMENTS

| | | | | |
|---|---|---|---|---|
| 6,079,329 | A | 6/2000 | Goovaard et al. | |
| 2002/0174946 | A1 | 11/2002 | Ikeda et al. | |
| 2015/0321497 | A1* | 11/2015 | Lingier | B41N 3/00 101/401.1 |
| 2017/0239935 | A1* | 8/2017 | Füllgraf | B41C 1/182 |

FOREIGN PATENT DOCUMENTS

| | | | |
|---|---|---|---|
| EP | 2191969 | A1 | 6/2010 |
| JP | 2006508828 | A | 3/2006 |
| JP | 2003082059 | A | 3/2019 |
| WO | 9519267 | A1 | 7/1995 |

OTHER PUBLICATIONS

Rehnotherm Kunststoffbeschichtungs GmbH; Surface Coatings for Industry; Glossary; "Elastomer" definition; https://www.rhenotherm.de/en/glossar/elastomer/; accessed Sep. 12, 2023. (Year: 1977).*

European Patent Office, European Search Report for European Patent Application No. 19194643, dated Feb. 4, 2020 (3 pages).

European Patent Office, International Search Report for International Patent Application No. PCT/EP2020/073165, dated Oct. 2, 2020 (3 pages).

China National Intellectual Property Administration, English Translation of First Office Action for China Patent Application No. 202080053772.5, dated Sep. 28, 2022, 1 page.

Japan Patent Office, Office Action for Japan Patent Application No. 2022-512737, dated Mar. 29, 2023, 12 pages.

European Patent Office, Office Action for European Patent Application No. 19194643.3, dated Nov. 4, 2022, 8 pages.

* cited by examiner

ADHESIVE PRINTING FORM ATTACHMENT LAYER IN TUBE SHAPE, METHOD FOR ITS MANUFACTURE, AND METHOD OF PRINTING USING THE SAME

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/EP2020/073165, filed on Aug. 19, 2020, designating the United States of America, which in turn claims the benefit of priority under 35 U.S.C. §§ 119, 365 of European Patent Application No. 19194643.3, filed Aug. 30, 2019, the contents of which are relied upon and incorporated herein by reference in their entirety.

FIELD OF THE DISCLOSURE

The present invention relates to an adhesive printing form attachment layer that is used in a flexographic printing process for adhesively fixing the printing form (also referred to as the "printing plate") to the cylinder via a printing sleeve during the printing process. The present invention further relates to an assembly of a printing form attachment layer and a printing sleeve (also referred to as a "printing cylinder") or a set of printing cylinders each being equipped with the adhesive printing form attachment layer, and to the use of the adhesive printing form attachment layer in a flexographic printing process.

BACKGROUND

There are several known methods of attaching a printing plate to a printing cylinder. Historically, the printing plate was directly mounted on the printing cylinder, yet this required stopping the printing process every time a new printing plate (or printing form) was to be attached. This was then superseded by the development of printing sleeves. A printing sleeve is a tubular device (see printing sleeve 200 shown in FIG. 3) typically made from plastic or metal that can be easily changed on a shaft of a printing machine. A printing sleeve carrying a printing plate and that is mounted on a printing machine can be quickly replaced by another printing sleeve carrying a different printing form, thereby reducing idle time of the printing machine. The printing sleeves with new printing forms can then be prepared while the printing machine is still operating.

The most widely used method for attaching a printing plate to a printing sleeve is the use of double stick tape, and the sleeve with the printing form attached via the double-stick tape is then mounted. Yet, the use of double-stick tape is cumbersome and a delicate operation, and requires significant time. The use of a double stick tape is also problematic in that there may occur difficulties in removing the tape from the printing cylinder and/or from the printing plate. Also, the double stick tape frequently leaves residues behind which will later interfere with the reuse of the printing plate or will deteriorate the printing performance in subsequent printing operations. Attaching the double stick tape uniformly and without causing surface irregularities that impair the printed image is also a cumbersome manual operation. In addition, the use of multiple pieces of double stick tape, as is generally required, makes alignment of the printing plate on the printing cylinder difficult, especially since removal and repositioning is difficult.

Another method involves the use of an adhesive printing form attachment layer that includes an adhesive photopolymer to adhere the printing plate to the printing cylinder. For instance, WO 95/19267 describes the use of an adhesive printing form attachment layer to replace the double stick tapes. The general term "adhesive" is used here in the meaning of "permanent tacky" or "permanent sticky", and the same meaning is encompassed by this term in the present invention. The document mentions that the adhesive printing form attachment layer is able to maintain its adhesive properties even during continued use and re-use (attachment and removal of several printing form), and that residues can be easily removed, while no residual photopolymeric material remains on the printing form. There is however no detailed teaching on the method for manufacturing the adhesive printing form attachment layer, other than that it is photopolymeric. Also, in WO 95/19267, the attachment means is prepared by providing sheets of the corresponding layered material and applying the sheets to a roll.

Providing the attachment means in this manner is still a cumbersome and time-consuming operation. When printing sleeves are used, the attachment of double stick tape of another attachment means in sheet form to prepare an adhesive surface forming the outer circumference of the printing sleeve can take more than 15 minutes even for a skilled technician. Also, the resulting outer circumference necessarily includes gaps or at least seams, i.e., areas where two sheets of the adhesive material are not directly in contact with each other or meet each other, respectively. Such seams often form weak portions in that they are the starting point for any unwanted release of the adhesive means from the printing sleeve. Such seams may also lead to irregularities in the surface, which may impair print quality.

The present invention aims at providing a novel adhesive printing form attachment layer that is able to provide for the reliable adhesive attachment of a printing form during a printing process to a printing cylinder, as well as a method for its manufacture. The adhesive printing form attachment layer is aimed at overcoming one or more drawbacks of prior art adhesive printing form attachment layers, and is in particular characterized by achieving improvements in one or more of the following aspects as compared to prior art adhesive printing form attachment layers:

faster and/or easier mounting on a printing sleeve;
improved durability and lifetime;
improved printing quality; and
the ability to provide for quasi-elastic properties.

Other and further advantages of the present invention will become more apparent in view of the following description.

SUMMARY OF THE DISCLOSURE

The present inventors have found that one or more of the problems underlying the present invention can be solved by providing an adhesive printing form attachment layer ("APFAL") in tube shape that can be pulled over a printing sleeve. Here, the permanently sticky layer forms at least the outer surface of the tube-shaped APFAL.

The present invention provides the following aspects:

1. A tube-shaped Adhesive Printing Form Attachment Layer comprising a permanently sticky layer and an elastic support layer, characterized in that the tube is seamless, and the permanently sticky layer forms the exterior of the tube.
2. Adhesive Printing Form Attachment Layer according to aspect 1, wherein the permanently sticky layer is elastic.

3. Adhesive Printing Form Attachment Layer according to aspect 1 or 2, wherein the Adhesive Printing Form Attachment Layer comprises an inner surface that is made from a non-permanently sticky material.
4. Adhesive Printing Form Attachment Layer according to any one of aspects 1 to 3, wherein each of the layers forming the Adhesive Printing Form Attachment Layer is elastic.
5. Adhesive Printing Form Attachment Layer according to aspect 1, wherein the permanently sticky layer is non-elastic, and divided into segments that allow the Adhesive Printing Form Attachment Layer to expand without breaking the permanently sticky layer segments.
6. Method of manufacturing an Adhesive Printing Form Attachment Layer according to any one of aspects 1 to 5, wherein one of the layers is formed by tube extrusion or blown film extrusion.
7. Assembly, comprising an Adhesive Printing Form Attachment Layer according to any one of aspects 1 to 5 mounted on a printing sleeve.
8. Method of forming the assembly according to aspect 7 by pulling the Adhesive Printing Form Attachment Layer according to any one of aspects 1 to 6 over the printing sleeve.
9. Method according to aspect 8, wherein the outer circumference of the Adhesive Printing Form Attachment Layer increases during or is increased prior to pulling the Adhesive Printing Form Attachment Layer over the printing sleeve, preferably by 2 to 50%.

According to an aspect of the disclosure, an attachment layer for a printing plate is provided that includes: a support layer; and a permanently sticky layer disposed over the support layer. The sticky layer and the support layer define a seamless tube. Further, the sticky layer defines an exterior surface of the tube.

According to a further aspect of the disclosure, an attachment layer for a printing plate is provided that includes: an elastic layer; and a permanently sticky layer disposed over the elastic layer. The sticky layer and the elastic layer define a seamless tube. Further, the sticky layer defines an exterior surface of the tube.

According to another aspect of the disclosure, a method of assembling a printing assembly is provided that includes: pulling an attachment layer for a printing plate over a printing sleeve. The attachment layer includes: a support layer; and a permanently sticky layer disposed over the support layer. The sticky layer and the support layer define a seamless tube. Further, the sticky layer defines a circumference and an exterior surface of the tube.

DETAILED DESCRIPTION OF THE PREFERRED EMBODIMENTS

Figure 1:
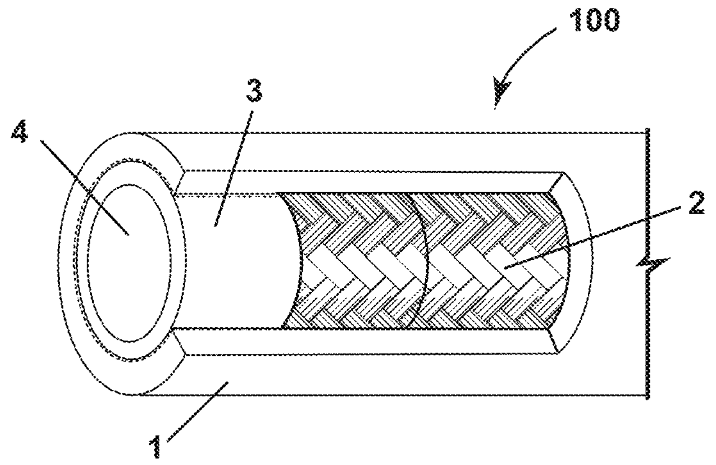
FIG. 1 is a schematic that shows an APFAL 100 according to one embodiment of the present invention. The tube-shaped APFAL 100 surrounds a void 4. The tube-shaped APFAL 100 comprises in this embodiment a permanently sticky layer ("PSL") 1, an intermediate elastic layer 2 and an inner layer 3.

In the present invention, all parameters and product properties relate to those measured under standard conditions (25° C., 105 Pa) unless stated otherwise.

All physical parameters can be determined by standard methods in the art and/or the following detailed description. In case of discrepancy between a standard method and a method described below, the present description prevails.

The term "comprising" is used in an open-ended manner and allows for the presence of additional components or steps. Without explicit mentioning, it however also includes the more restrictive meanings "consisting essentially of" and "consisting of". Here, "consisting essentially of" means that other components than those recited may be present in an amount that does not sacrifice the success of the invention.

Whenever a range is expressed as "from x to y", or the synonymous expression "x-y", the end points of the range (i.e., the value x and the value y) are included. The range is thus synonymous with the expression "x or higher, but y or lower".

As used herein, the indefinite article "a" indicates one as well as more than one and does not necessarily limit its reference noun to the singular.

The term "about" means that the amount or value in question may be the specific value designated or some other value in its neighborhood, generally within a range of ±5% of the indicated value. As such, for instance the phrase "about 100" denotes a range of 100±5.

The term "and/or" means that either all or only one of the elements indicated is present. For instance, "a and/or b" denotes "only a", or "only b", or "a and b together". In the case of "only a" the term also covers the possibility that "b" is absent, i.e., "only a, but not b".

The term "translucent" denotes that a material is able to transmit electromagnetic radiation in the range of 250 to 700 nm. The luminous transmittance of a translucent material is typically 50% or higher, such as 70% or higher or 80% or higher, at all wavelengths falling within the range from 250 to 700 nm, determined on a sample of a material having a thickness of 1 mm according to ASTM D1003-07 (Procedure A). "Translucent" materials also include transparent materials.

The term "crosslinkable" denotes that a composition or compound is able to undergo a crosslinking reaction upon proper initiation, such as by irradiation with electromagnetic radiation, electron beams or heat, preferably only upon irradiation with electromagnetic radiation having a wavelength of 350 nm or shorter, in the following also referred to as UV. The term "crosslinked" denotes the material that is obtained after the crosslinkable composition or compound has undergone a crosslinking reaction.

In the present invention, whenever reference is made to the molecular weight of a polymeric compound, it is generally the weight-average molecular weight unless indicated differently, and the molecular weight is determined by a GPC method using a polystyrene standard.

The term "layer" denotes a material having a physical shape in which the extension in each of two directions that are orthogonal to each other (x, y) exceeds that in a third direction (z) that is orthogonal to each of the directions x any y by a factor of 10 or more, such as 100 or more, 500 or more or 1000 or more. The direction "z" may also be referred to as the thickness of the layer. The term "layer" also includes a sheet as a specific form of a layer.

The term "sticky" used in the definition denotes a surface stickiness of at least 400 gram as measured by ASTM standard D-2979-95. The term "permanently sticky" means that sticky properties are preserved over time, e.g., after 10 attachments and removals of a printing form made from a polymeric material.

The term "(meth)acrylic monomer" denotes esters of acrylic acid and methacrylic acid, such as alkyl esters wherein the alkyl group has 1 to 18 carbon atoms, as well as methacrylic acid and acrylic acid.

In the sense of the present invention, a printing form attachment layer ("APFAL") is a structure that is able to provide a support for a printing form (also referred to as a "printing plate"), in particular a flexographic printing plate, during a printing process when mounted on a printing sleeve. The APFAL layer has a permanently sticky layer ("PSL") that carries the printing form, and which forms the outermost surface of the tube-shaped APFAL. The PSL is able to fix the printing plate by adhesive force due to its inherent stickiness. The APFAL may also comprise a substrate, which is typically also in the form of a layer. During use, the substrate is oriented towards the printing sleeve, and it may be provided on the printing sleeve directly or via an intermediate layer, such as a cushioning layer or transport layer, but typically without an intermediate or cushioning layer.

In the present invention, the term "elastic" denotes the ability of a material to be deformed (expanded) by applying a force without breaking, and by exerting a counter-force that is typically proportional to the degree of deformation (expansion), at least until a certain degree (such as 10% or more) of deformation has been reached. A layer of the tube-shaped APFAL of the present invention is defined as being elastic if its inner diameter can be expanded by 5% or more, such as 10% or more or 15% or more, without breaking, relative to the inner diameter before applying a force. An elastic material generally returns to about its original diameter before application of the force, even though some widening (e.g., by 3% or less) may occur.

The present inventors have completed the present invention based on the finding that an APFAL that is provided in the form of a tube that can be simply pulled over a printing sleeve allows greatly reducing the preparation time of a sleeve/APFAL assembly, and thus facilitates a more time- and cost-efficient printing process. The cumbersome work of fitting an APFAL to a printing sleeve can be significantly reduced, and the APFAL can be reversibly attached for holding a printing plate, and then detached, thereby allowing re-use of the APFAL. This provides a significant advantage over double-stick tape or APFALs that are not in tube shape, as here often the APFAL is destroyed or damaged at the time of removal from the printing sleeve.

Further, the APFAL of the present invention can be checked for quality prior to application to a printing sleeve (by pulling it over the sleeve), which makes quality control easier. Also, the step of pulling the APFAL over the sleeve is less prone to mistakes as compared to the provision of a double stick tape or a permanently attached APFAL (i.e., an APFAL that cannot be reversibly attached and detached to and from the printing sleeve, as the APFAL of the present invention). Here, mistakes may be made even at the end of the fitting process, in which case the APFAL would need to be discarded and the attachment to the sleeve be started anew.

In one embodiment, the APFAL of the present invention is in the shape of a seamless tube. Herein, the term "seamless" denotes that there is no connecting portion in the longitudinal direction of the tube-shaped APFAL as is formed when a tube-shaped body is constructed by rolling a sheet around a cylinder and connecting the ends of the sheet. Such a seamless tube-shaped APFAL can be constructed by techniques known in the art, in particular by tube extrusion or blown film extrusion. In this manner, also multilayer APFALs can be manufactured by multilayer co-extrusion. Such a multilayer APFAL may comprise (or consist of) 2, 3 or 4 layers. If there are 2 layers, these are the PSL and the substrate layer. In case of 3 layers, there may be an additional layer between the substrate and the PSL (such as a cushioning layer or elastic layer), or it may be provided on the side of the substrate opposite the substrate. In the latter case, the layer on the side opposite the substrate layer may be a layer of a non-sticky material (e.g., a stiff, smooth plastic film from a non-sticky material).

It is also possible to prepare a foamed or crosslinked material layer by effecting foaming after the composition has left the extrusion head (e.g., by including a latent foaming agent, and activating it after the extrusion, e.g., by heat or irradiation). A crosslinked material layer, which may be the PSL, can be produced by extruding a precursor composition comprising a suitable initiator, such as a UV crosslinking initiator, and then effecting crosslinking shortly after the extrusion, e.g., by providing for a UV lamp downstream of the extruder head.

An additional layer to a seamless tube-shaped body provided by extrusion as outlined above may be provided by techniques other than extrusion. For example, an additional layer (which may be the PSL) may be provided by spraying or otherwise providing a suitable permanently sticky material for the PSL on a support in tube-shaped form, preferably a seamless tube. Here, it is also possible to provide a material layer, e.g., by spraying, followed by a suitable after-treatment, such as foaming or crosslinking. Of course, also various other layers may be provided in this manner. For instance, the inner surface of the tube-shaped APFAL may be formed by a gliding material, which may be either in the form of a separate layer or may be provided by post-treating a suitable layer.

Possible configurations of the APFAL of the present invention thus include the following example configurations (seen from the interior to the exterior of the tube-shaped APFAL):

- Single PSL
- Support Layer—PSL
- Elastic Layer—PSL
- Inner Layer—Support Layer—PSL
- Inner Layer—Elastic Layer—PSL
- Inner Layer—Elastic Layer—Support Layer—PSL
- Support Layer—Elastic Layer—PSL Each of these layers will be described in more detail below:

Permanently Sticky Layer (PSL)

The PSL is the only mandatory layer of the APFAL and must be suitable for receiving a printing form and fixing a printing form during a printing operation. It may be provided on another layer, such as the support layer or an elastic layer. The PSL forms the outer surface of the tube-shaped APFAL. The PSL may in itself be elastic or non-elastic.

The PSL may be a seamless tube, and can be produced by suitable extrusion techniques. The PSL exhibits its permanently sticky properties by including a permanently sticky material as is known in the field, e.g., a material based on polymers selected from polyurethanes, acrylates, silicones and other polymers capable of exhibiting permanently sticky properties. The present invention is not limited to any of these compounds, and one or more of these can be used for the PSL.

In case the PSL is the only layer of the APFAL, it may be preferable to design it as an elastic layer in order to facilitate the mounting on the printing sleeve. In this case, the elastic properties may be obtained by including an elastic rubber component in the composition.

In order to obtain good adhesion of a printing plate and simultaneously allow easy manufacture by an extrusion process, the PSL may be a crosslinked material. In this case, a non-crosslinked crosslinkable composition comprising, e.g., a polyurethane prepolymer having crosslinkable groups, may be extruded; and then the material can be crosslinked after the extrusion by, e.g., UV irradiation.

Alternatively, the PSL may be formed by first providing a substrate layer, which may be porous, e.g., a porous or foamed layer that may be a seamless layer formed by extrusion and optionally subsequent foaming, and then providing a crosslinkable composition throughout or only on the outer circumference of the substrate layer, e.g., by spraying or dipping. This may be followed by crosslinking, e.g., by UV or heat.

In case the APFAL is formed by only the PSL, it may be possible to pull the APFAL over the printing sleeve without any after-treatment, in particular in case the APFAL is elastic and can be expanded and then "snapped on" the printing sleeve. Here, "pulling" the APFAL over the sleeve does not require a sliding contact between the printing sleeve and the APFAL during the fitting operation, and the elastic APFAL may be held in an expanded state in which then the printing sleeve is inserted into the void of the expanded APFAL.

Yet, in case the material of the APFAL is not able to be expanded to an extent that allows such an operation, a gliding contact with the printing sleeve may not be avoidable during the fitting of the APFAL to the printing sleeve. Here, the inner surface of the PSL (or the APFAL in case further layers are present) may be treated by providing a surface that does not possess permanently sticky properties, e.g., by providing a metal foil or a glidant substance such as talc or magnesium stearate.

The PSL preferably does not contain microspheres.

Support Layer

Depending on the composition and structure of the PSL, it may for some cases be beneficial to provide an additional support layer, e.g., in order to provide for a greater strength of the APFAL. Such a support layer may be formed simultaneously with the PSL, e.g., by coextrusion, or may be formed separately and then bound to the APFAL using a suitable adhesive.

The support layer may be elastic or non-elastic. The support layer may, for instance, be formed from a rubber or other elastic material. The support layer is typically designed such as to be not permanently sticky, and a non-elastic support layer may be a plastic film, e.g., made from a polyolefin, polyamide, polyester or similar general engineering plastic. If elastic properties are desired, a more flexible material such as polyurethane or a diene-based polymer or copolymer may be used, such as EPDM.

By providing an additional support layer, it may become easier to provide for the desired balance of properties, in particular the desired strength, durability, high stickiness on the outer surface and ability to be pulled over a printing sleeve at the inner surface of the tube-shaped APFAL.

Elastic Layer

Figure 2:
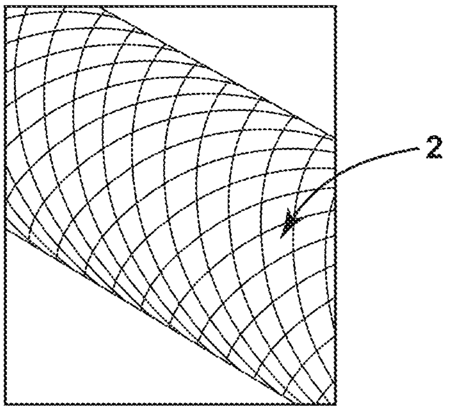
FIG. 2 is a schematic that shows an example of a possible structure of an elastic layer 2.

In addition to the PSL and the optional substrate layer, there may be an elastic layer. This layer is mainly designed in order to provide elastic properties to the APFAL, and may be a non-continuous layer. Here, the term "non-continuous" means that the layer may have a grid structure or other structure with through-holes. Such a layer may have a design as shown illustratively in FIGS. 1 and 2 (see elastic layer 2), and may be formed of an elastic grid-like or net structure, e.g., made from rubber or a suitable other material. The elastic layer may also rely on spring-like properties as obtained by using a suitable metal or alloy structure. Of course, the elastic layer may have a different structure to the one shown in FIGS. 1 and 2 (see elastic layer 2).

In case the APFAL is desired to be elastic and the elastic properties are obtained by including a corresponding elastic layer, the combination with a non-elastic PSL (and optionally other non-elastic layers) would avoid the need of obtaining elastic properties of the other layers. In such a case, it may thus be contemplated to cut the PSL and any other optional layer present, if any, into discrete segments that space apart upon expansion of the elastic layer.

As in the state in which the APFAL is mounted on a printing sleeve the expansion vs. the non-mounted state is generally small (such as +2% or more, such as +5% or more, but generally 30% or less, e.g., 15% or less), providing the PSL in such a segmented manner would not lead to major portions of the outer circumference of the APFAL not being covered by the PSL, and would hence not significantly impair the stickiness of the PSL and its ability to hold the printing form in place during a printing operation.

Inner Layer

In addition to the PSL (and the optional support layer and/or the optional elastic layer, if present), the APFAL may comprise an inner layer forming the innermost surface of the APFAL that comes into contact with the outer surface of the printing sleeve. This innermost layer may be designed such as to allow a good fixation of the APFAL on the printing sleeve, but may at the same time also provide for a limited ability to draw (or pull) the APFAL over the printing sleeve surface in gliding contact. To this end, the material of the inner layer is not particularly limited, but may be a natural or synthetic rubber material, such as EPDM, which is optionally treated by including a gliding agent such as a lubricating oil, or a solid gliding agent such as magnesium stearate or talc.

Assembly of Printing Sleeve and APFAL, and Method of Printing

Figure 3:
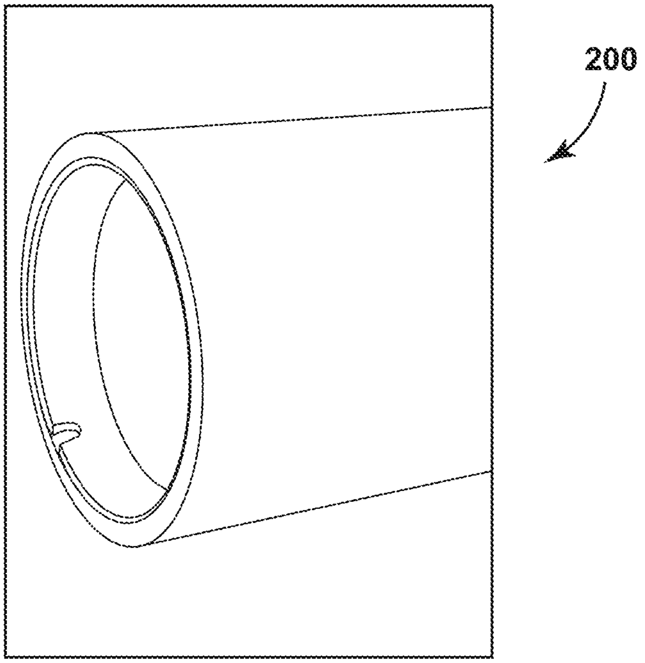
FIG. 3 is a photograph that shows an example of a printing sleeve 200 over which the APFAL 100 of the present invention (e.g., as shown in FIG. 1) can be pulled to provide the assembly of the present invention. Here, the printing sleeve 200 is entered into the void 4 (see FIG. 1), so that the APFAL 100 is reversibly attached to the printing sleeve 200.

In case the APFAL has elastic properties, it generally has an inner diameter that is smaller (e.g., by 2% or more, but generally 50% or less) than the outer diameter of the printing sleeve (see printing sleeve 200 in FIG. 3). The APFAL may then be expanded and simultaneously pulled over the sleeve, e.g., manually, without any further assistance, but a gliding agent may also be used. "Pulling over" can in this case mean pulling in gliding contact with the sleeve, or expanding the APFAL and "snapping" it on the sleeve by releasing the expanding force.

The APFAL in its expanded form as applied on the sleeve then provides the necessary fixation on the printing sleeve by pressing against it, due to its elastic properties. Thereby, the APFAL is reversibly attached to the printing sleeve, and can serve to receive a printing plate and can fix the same during a printing operation. A printing plate can then be detached, and a new printing plate attached and then be used for printing. Once the APFAL requires cleaning, e.g., due to adhesion of printing residues, it can be detached from the printing sleeve by pulling it off, and then can be cleaned using a suitable solvent.

As derivable from the above, an elastic APFAL may be used to fit to a variety of printing sleeves with similar, but different sizes (depending on the extent of the elastic properties). This is a further advantage of the present invention that cannot be realized with conventional APFALs.

In case the APFAL is non-elastic, it should generally be manufactured such that its inner diameter closely matches the outer diameter of the printing sleeve for which it shall be used. In this case, the fixation on the printing sleeve is not caused by the back-force exerted by the elastic properties of the APFAL, but is mainly caused by the grip of the inner surface of the APFAL to the outer surface of the printing sleeve. It may in this case be preferable to provide the inner surface of the APFAL with suitable properties, such as by providing a rubbery material (e.g., an alpha-olefin/diene copolymer or similar rubber). In order to facilitate the mounting of the APFAL on the printing sleeve, it may then be contemplated to use either a gliding agent, or preferably to provide for an air cushion on which the APFAL glides, e.g., by using a printing sleeve having openings through which a gas, such as compressed air, may be forced by applying an external pressure. While the pressure is applied, the APFAL can be pulled over and pulled off from the printing sleeve, while secure attachment is obtained once the flow of gas is stopped. This concept may of course also be applied for elastic APFALs, yet may in such a case not be necessary.

The invention claimed is:

1. An attachment layer for a printing plate, comprising:

a support layer comprising an elastic material or a non-elastic material; and a permanently sticky layer disposed directly on the support layer, wherein the permanently sticky layer and the support layer define a seamless tube, further wherein the permanently sticky layer defines an exterior surface of the seamless tube, and further wherein the permanently sticky layer is disposed directly on the support layer as discrete segments that space apart from each other upon expansion of the support layer.

2. The attachment layer of claim 1, wherein the permanently sticky layer is elastic and comprises a polymer selected from the group consisting of a polyurethane, an acrylate, and a silicone.

3. The attachment layer of claim 2, wherein the support layer defines an interior surface of the tube and comprises a non-permanently sticky material.

4. The attachment layer of claim 3, wherein the support layer comprises the elastic material and the elastic material is selected from the group consisting of a rubber, a polyurethane, a diene-based polymer, and a diene-based copolymer.

5. The attachment layer of claim 1, wherein the layers define the seamless tube by tube extrusion or blown film extrusion.

6. A printing assembly, comprising:

the attachment layer for a printing plate according to claim 1; and a printing sleeve, wherein the attachment layer is mounted on the printing sleeve.

7. The attachment layer of claim 1, wherein the support layer is a plastic film.

8. The attachment layer of claim 7, wherein the support layer consists of a polyolefin, a polyamide, or a polyester.

9. The attachment layer of claim 1, wherein the support layer consists of a non-permanently sticky material.

10. The attachment layer of claim 1 further comprising an inner layer around which the support layer is disposed, the inner layer forming an innermost surface of the attachment layer.

11. The attachment layer of claim 10, wherein the inner layer comprises a natural or synthetic rubber material.

12. The attachment layer of claim 1, wherein the permanently sticky layer comprises a silicone polymer.

13. An attachment layer for a printing plate, comprising:

an inner layer comprising a natural or synthetic rubber material;

an elastic layer disposed directly on the inner layer, the elastic layer being non-continuous in a grid-like or net-like structure comprising a rubber; and a permanently sticky layer disposed over the elastic layer, wherein the inner layer, the sticky layer, and the elastic layer define a seamless tube, wherein the inner layer defines an interior surface of the seamless tube, and further wherein the sticky layer defines an exterior surface of the seamless tube.

14. The attachment layer of claim 13, wherein the permanently sticky layer is elastic and comprises a polymer selected from the group consisting of a polyurethane, an acrylate, and a silicone.

15. The attachment layer of claim 13, wherein the permanently sticky layer is disposed upon the elastic layer as discrete segments that space apart from each other upon expansion of the elastic layer.

16. The attachment layer of claim 13, wherein the inner layer further comprises a gliding agent selected from the group consisting of lubricating oil, magnesium stearate or talc.

17. The attachment layer of claim 13, wherein the layers define the seamless tube by tube extrusion or blown film extrusion.

18. A printing assembly, comprising:

the attachment layer for a printing plate according to claim 13; and a printing sleeve, wherein the attachment layer is mounted on the printing sleeve.

19. A method of assembling a printing assembly, comprising:

pulling an attachment layer for a printing plate over a printing sleeve, wherein the attachment layer comprises:

a support layer comprising an elastic material or a non-elastic material; and a permanently sticky layer disposed directly on the support layer, wherein the permanently sticky layer and the support layer define a seamless tube, further wherein the permanently sticky layer defines a circumference and an exterior surface of the seamless tube, and further wherein the permanently sticky layer is disposed directly on the support layer as discrete segments that space apart from each other upon expansion of the support layer.

20. The method of claim 19, further comprising:
expanding the circumference of the tube by 2% to 50%, wherein the expanding step is conducted before or during the pulling of the attachment layer.

* * * * *